(12) United States Patent
Harashima et al.

(10) Patent No.: US 8,533,140 B2
(45) Date of Patent: Sep. 10, 2013

(54) METHOD AND SYSTEM FOR DESIGN CHECK KNOWLEDGE CONSTRUCTION

(75) Inventors: Ichiro Harashima, Hitachioota (JP); Koji Shiroyama, Mito (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 12/749,708

(22) Filed: Mar. 30, 2010

(65) Prior Publication Data

US 2011/0060712 A1   Mar. 10, 2011

(30) Foreign Application Priority Data

Sep. 9, 2009 (JP) .................................. 2009-208225

(51) Int. Cl.
*G06F 17/00* (2006.01)
*G06N 5/02* (2006.01)
*G06N 7/00* (2006.01)
*G06N 7/08* (2006.01)
*G06F 17/27* (2006.01)
*G06F 7/00* (2006.01)
*G06F 17/30* (2006.01)

(52) U.S. Cl.
USPC ................... 706/47; 706/55; 704/9; 707/758

(58) Field of Classification Search
USPC ........................ 706/47, 55; 704/9; 707/758
See application file for complete search history.

(56) References Cited

U.S. PATENT DOCUMENTS

| | | | |
|---|---|---|---|
| 7,243,085 B2 * | 7/2007 | Hatta .............................. | 706/12 |
| 2008/0229262 A1 | 9/2008 | Harashima et al. | |
| 2008/0243842 A1 * | 10/2008 | Liang et al. ........................ | 707/6 |
| 2009/0083261 A1 * | 3/2009 | Nagano et al. .................... | 707/5 |

FOREIGN PATENT DOCUMENTS

| | | |
|---|---|---|
| JP | 01-263834 | 10/1989 |
| JP | 01-318120 | 12/1989 |
| JP | 02-047727 | 2/1990 |
| JP | 07-295826 | 11/1995 |
| JP | 09-146988 | 6/1997 |
| JP | 10-291143 | 11/1998 |
| JP | 2003-108569 | 4/2003 |
| JP | 2008-234011 | 10/2008 |

OTHER PUBLICATIONS

Sunao Takafuji et al.; Semantic understanding model for a patent document based on device ontology; Japanese Society for Artificial Intelligence, 2007; pp. 1-4; The Institute of Science and Industrial Research, Osaka University.

* cited by examiner

*Primary Examiner* — Jeffrey A Gaffin
*Assistant Examiner* — James F Sugent
(74) *Attorney, Agent, or Firm* — Antonelli, Terry, Stout & Kraus, LLP.

(57) ABSTRACT

Disclosed is a design check knowledge construction system that adequately improves the quality of check knowledge and fully enhances the quality of a product, which is a final target to be checked. The check target knowledge definition section generates check target knowledge definition data, which is obtained by defining check target knowledge (check knowledge) that serves as a target field to be checked, in accordance with the relationship between a word group and words in the word group and with reference to technological ontology concerning technological basic intelligence input from a user input/output section. The word association section extracts a word group from a document data group associated with the word group in the check target knowledge definition data and associates words in the word group with each other in accordance with the document data group including a plurality of document data based on knowledge content.

14 Claims, 8 Drawing Sheets

METHOD AND SYSTEM FOR DESIGN CHECK KNOWLEDGE CONSTRUCTION

BACKGROUND OF THE INVENTION (1) Field of the Invention

The present invention relates to a design check knowledge construction method and system that use a computer to provide construction support and management for check knowledge for evaluating design information about a design target.

(2) Description of the Related Art

The contents of a design (design information) have been generally checked in accordance with a checklist in order to assure the quality of the results of creative activities of human beings, such as artificial objects, particularly, products designed and manufactured by human beings.

The contents of the checklist for use at a product design stage include not only safety and other regulations and standards but also previous troubles, design and manufacture standards, accumulated knowhow, and other knowledge in the form of a rule. Here it is assumed that these contents are generically referred to as check knowledge.

In recent years, the check knowledge is managed in the form of an electronic data file in addition to paper or shared and managed through the use of a file server or database. When a user uses the check knowledge, the user may perform a search and narrow down the contents of the check knowledge by specifying a category or keyword and compile the result in the form of a checklist, or may compile the entire contents in the form of a checklist so as not to leave anything unchecked.

Technologies for document search, or more particularly, technologies for document classification or document interpretation support, are well known as technologies for knowledge management. As a technology for document classification, a method for building a classification database (thesaurus or classification ontology) by entering text documents and keyword source documents, which serve as a source of keywords, is proposed, for instance, in Japanese Patent Application Laid-Open Publication No. 2003-108569, which is entitled "Classification Processing Device, Classification Processing Device Control Method, Control Program, and Recording Medium." As a technology for document interpretation support, a modeling technology for interpreting patent documents with ease from the viewpoint of intellectual property management is proposed, for instance, in a paper entitled "Patent Document Meaning Interpretation Model based on Device Ontology and Its Implementation (Patent Understanding Computer)," authored by Jun Takatoh, Yoshinobu Kitamura, and Riichiro Mizoguchi, and presented at Japanese Society for Artificial Intelligence Annual Meeting 2007.

The check knowledge tends to increase because new findings, failure countermeasures, and other relevant information are incorporated into it. Meanwhile, the contents of the check knowledge need to be reviewed after each technological innovation because manufacturing technologies rapidly advance. In general, the check knowledge is manually constructed and maintained. Therefore, the number of required man-hours increases with an increase in the amount of knowledge. Further, if the check knowledge is inadequately maintained, product quality deteriorates.

If the well-known technologies are applied to the construction and maintenance support for the check knowledge, the method described, for instance, in Japanese Patent Application Laid-Open Publication No. 2003-108569, which is entitled "Classification Processing Device, Classification Processing Device Control Method, Control Program, and Recording Medium," may facilitate the classification and orderly disposition of the contents of the check knowledge, whereas the method described, for instance, in the paper entitled "Patent Document Meaning Interpretation Model based on Device Ontology and Its Implementation (Patent Understanding Computer)," authored by Jun Takatoh, Yoshinobu Kitamura, and Riichiro Mizoguchi, and presented at Japanese Society for Artificial Intelligence Annual Meeting 2007 may facilitate the understanding of the check knowledge as it converts a designated piece of content in the check knowledge to an easy-to-understand function decomposition tree. However, neither of these methods provides check knowledge contraction support (no associated technology is described in the above related-art documents). Therefore, neither of these methods can adequately improve the quality of the contents of the check knowledge and fully enhance the quality of a product, which is a final target to be checked.

The present invention has been made to address the above technical problems, and provides a design check knowledge construction method and system that make it possible to adequately improve the quality of the contents of the check knowledge and fully enhance the quality of a product, which is a final target to be checked.

SUMMARY OF THE INVENTION

In addressing the above technical problems, according to a first aspect of the present invention, there is provided a design check knowledge construction method that uses a computer to construct check knowledge for evaluating design information about a design target created during design work, the method including the steps of: generating check target knowledge definition data that is obtained by defining the check knowledge, which represents a check target field, in accordance with the relationship between a word group and words in the word group and with reference to technological ontology concerning input technological basic intelligence; and, in accordance with a document data group including a plurality of document data based on knowledge content concerning technological history information, extracting a word group from the document data group associated with the word group in the check target knowledge definition data and associating words in the word group with each other.

According to a second aspect of the present invention, there is provided the design check knowledge construction method as described in the first aspect, the method further including the steps of: selecting a word from the associated words as a predefined constraint condition candidate, and performing an edit on the selected word to prepare constraint data in the form of text or a mathematical expression; and generating check data from the constraint data, the check data being designed for use with an automatic check system coordinated with a predefined list construction function.

The present invention makes it possible to provide construction and maintenance support for check knowledge effective for quality control of the results of product design with high efficiency and with a small number of man-hours. Consequently, it is possible to enhance and update the quality of the check knowledge and provide improved quality and enhanced efficiency by running a product check at a final design stage and at a manufacturing stage.

BRIEF DESCRIPTION OF THE DRAWINGS

Embodiments of the present invention will be described in detail based on the following figures, wherein.

DETAILED DESCRIPTION OF THE INVENTION

Figure 1:
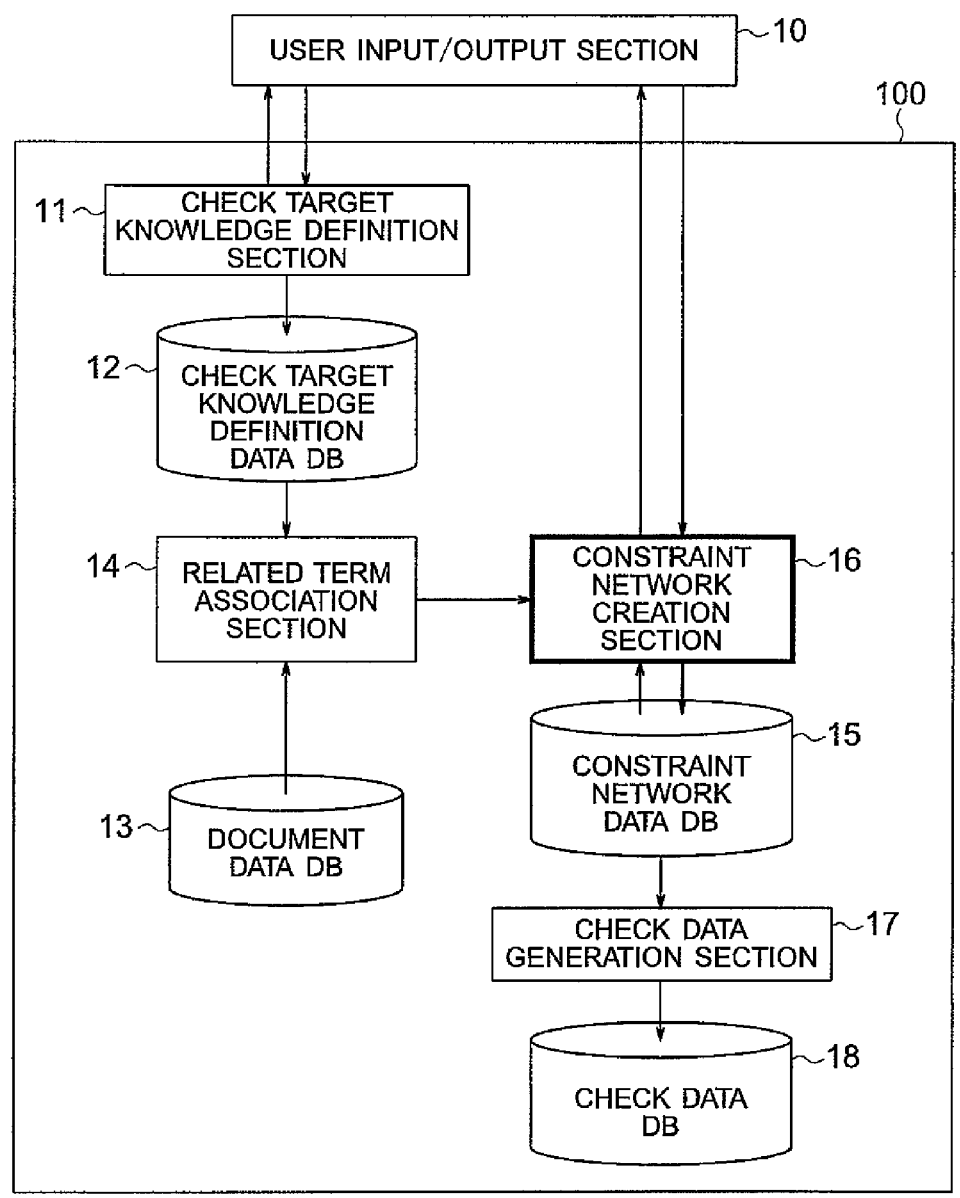
FIG. 1 is a functional block diagram illustrating the basic configuration of a design check knowledge construction system according to a first embodiment of the present invention.

The design check knowledge construction method and system according to an embodiment of the present invention will now be described in detail with reference to the accompanying drawings.

First of all, a technical overview of the design check knowledge construction method according to an embodiment of the present invention will be given. The design check knowledge construction method uses a computer to construct check knowledge for evaluating design information about a design target created during design work. It basically includes a check target knowledge definition data generation step and a word association step. The check target knowledge definition data generation step generates check target knowledge definition data that is obtained by defining the check knowledge, which represents a check target field, in accordance with the relationship between a word group and words in the word group and with reference to technological ontology concerning input technological basic intelligence. The word association step is performed in accordance with a document data group including a plurality of document data based on knowledge content concerning technological history information to extract a word group from the document data group associated with a word group in the check target knowledge definition data and associate words in the word group with each other.

The technological basic intelligence includes, for instance, documents concerning in-house and outside textbook-like technical information constructed by intellectuals, and is equivalent to technological ontology indicating check target knowledge based on the contents of documents (document data) about technical systems, functions, methods, failures, failure causes, failure countermeasures, and the like. The technological history information is equivalent to knowledge content based on the contents of documents (document data) about routine job execution reports, results, previous troubles, research papers, and the like.

When a word group is to be extracted from a document data group related to a word group in the check target knowledge definition data in the aforementioned word association step, it is preferred that words common to the word group in the check target knowledge definition data, a synonym group related to the word group, and the word group in the document data group be output. Further, when the word group in the document data group related to the word group in the check target knowledge definition data is to be extracted in the word association step, it is preferred that words derived from the morphological analysis of text containing words common to the word group in the check target knowledge definition data, the synonym group related to the word group, and the word group in the document data group be output.

Furthermore, when the word group in the check target knowledge definition data and the word group in the document data group are to be simultaneously presented in the word association step, it is preferred that the associated words be displayed while they are positioned close to each other or while they are interconnected with a line segment. Moreover, when the word group in the document data group related to the word group in the check target knowledge definition data is to be extracted in the word association step, it is preferred that a keyword group for extracting candidate constraints for a check item corresponding to check knowledge from words be set up in advance to search for a document data group containing keywords in the keyword group and output words derived from the morphological analysis of text containing the keywords. In addition, when the word group in the check target knowledge definition data and the word group in the document data group are to be simultaneously presented in the word association step, it is preferred that a node and a link be used to display the word group and the relationship between words in the word group, respectively, while performing a link selection/status switching process to select a link required for performing a link finalization process, which indicates the association between words in the word group, and retain and switch the status of the link between finalized and nonfinalized.

In any event, the design check knowledge construction method according to an embodiment of the present invention includes, as subsequent functional processing steps, a constraint data editing step, which is performed to select a word from the associated words as a predefined constraint condition candidate and perform an edit on the selected word to prepare constraint data in the form of text or a mathematical expression, and a check data generation step, which is performed to generate check data from the constraint data, the check data being designed for use with an automatic check system coordinated with a predefined list construction function.

The use of the above-described design check knowledge construction method makes it possible to provide construction and maintenance support for check knowledge effective for quality control of the results of product design with high efficiency and with a small number of man-hours. Consequently, it is possible to enhance and update the quality of the check knowledge and provide improved quality and enhanced efficiency by running a product check at a final design stage and at a manufacturing stage.

The design check knowledge construction system according to some embodiments of the present invention will now be described in detail.

[First Embodiment]

FIG. 1 is a functional block diagram illustrating the basic configuration of the design check knowledge construction system according to a first embodiment of the present invention.

The design check knowledge construction system is configured so that a user input/output section 10 and an information processing PC (personal computer) 100 are interconnected so as to permit data exchange between them. The user input/output section 10 includes input devices, such as a keyboard and a mouse, and an output device, such as a display.

The information processing PC 100 includes a check target knowledge definition section 11, a check target knowledge definition data DB (database) 12, a knowledge content based document data DB (database) 13, a related term association section 14, a constraint network data DB (database) 15, a constraint network creation section 16, a check data generation section 17, and a check data DB (database) 18.

The check target knowledge definition section 11 relates to the technological ontology about the technological basic intelligence input via an input device of the user input/output section 10, generates check target knowledge definition data, which is obtained by defining check target knowledge (check knowledge) that serves as a target field to be checked, in accordance with the relationship between a word group and words in the word group, and stores the generated check target knowledge definition data in the check target knowledge definition data DB 12. The check target knowledge is generally referred to as an "ontology," and the relationship between a word group, which expresses knowledge, and words in the word group is represented by a tree structure or a network structure.

In accordance with a document data group formed by multiple document data based on knowledge content concerning technological history information stored in the document data DB 13, the related term association section 14 extracts a word group from a document data group related to a word group in the check target knowledge definition data and associates the words in the word group with each other. In other words, the related term association section 14 functions as a word association section that performs a matching process on an individual word basis between the check target knowledge definition data DB 12 and the document data DB 13.

The matching process for words may be performed to search for either a perfect match or a partial match. When a dictionary of synonyms for a target field is prepared, words having similar meanings may also be searched for in the matching process. When a matching word is found in the matching process, a group of words frequently used together with the matching word (collocation words) are extracted from the document data DB 13 and displayed together with the matching word.

The constraint network creation section 16 displays, in the form of a network node and a link, an inter-word relationship network in the check target knowledge definition data DB 12 and the associated words and relevant collocation words extracted or generated by the related term association section 14, generates constraint network data in accordance with edits performed by a user, and stores the constraint network data in the constraint network data DB 15. The constraint network creation section 16 functions as a constraint data editing section that selects a predefined constraint condition candidate from the words associated by the related term association section 14 and performs an edit on the selected word to prepare constraint data in the form of text or a mathematical expression.

The check data generation section 17 inputs the constraint network data from the constraint network data DB 15, and converts the constraint network data into a tabular form or other form that a human can easily recognize. When, for instance, a computer runs a check through data communication with a CAD system, conversion is effected in the employed data format. In other words, the check data generation section 17 generates check data for use with an automatic check system, which is coordinated with a predefined list construction function, from the constraint network data (constraint data) derived from the constraint network creation section 16.

Figure 2:
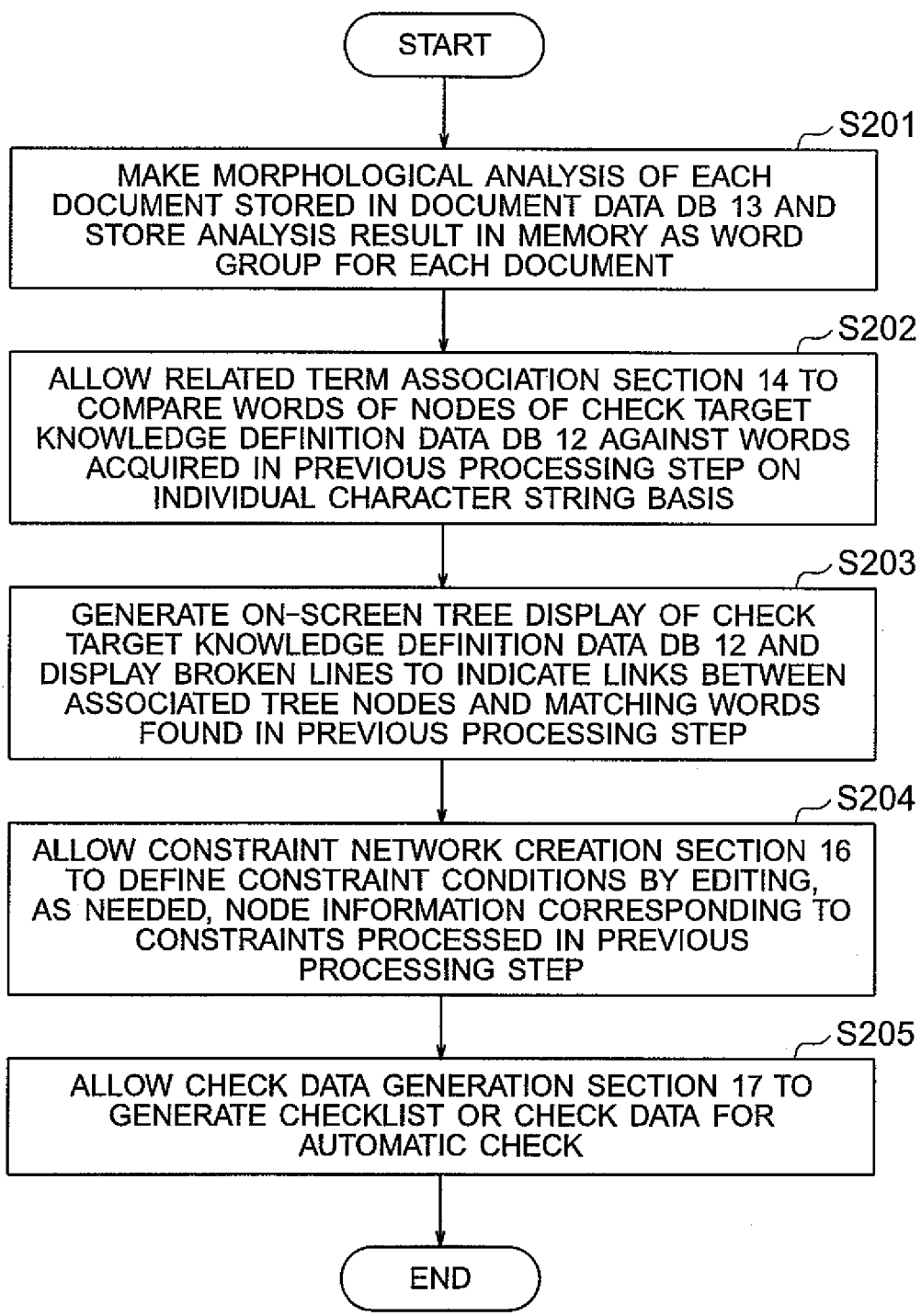
FIG. 2 is a flowchart illustrating simplified operating steps that are performed by a basic function of the design check knowledge construction system shown in FIG. 1.

FIG. 2 is a flowchart illustrating simplified operating steps that are performed by a basic function of the design check knowledge construction system according to the first embodiment.

The design check knowledge construction system first performs step S201 to make a morphological analysis of each document stored in the document data DB 13 and stores the analysis result in a memory in the form of a word group for each document.

Next, step S202 is performed by the related term association section 14 to compare the words of nodes constituting the check target knowledge definition data stored in the check target knowledge definition data DB 12 against the words stored in the memory in the previous processing step (step S201) on an individual character string basis.

Next, step S203 is performed to generate an on-screen tree display (or a network display) of the check target knowledge definition data stored in the check target knowledge definition data DB 12 and display broken lines to indicate links between the aforementioned associated tree nodes and words that are found in the previous processing step (step S202) to have the same character string (plus collocation words for the words having the same character string).

Next, step S204 is performed by the constraint network creation section 16 to define constraint conditions by editing, as needed, node information corresponding to constraints processed in the previous processing step (step S203).

Next, step S205 is performed by the check data generation section 17 to generate a checklist or check data for an automatic check that is performed through data communication with a CAD system or the like.

The design check knowledge construction system according to the first embodiment makes it possible to provide construction and maintenance support for check knowledge effective for quality control of the results of product design with high efficiency and with a small number of man-hours.

[Second Embodiment]

Figure 3:
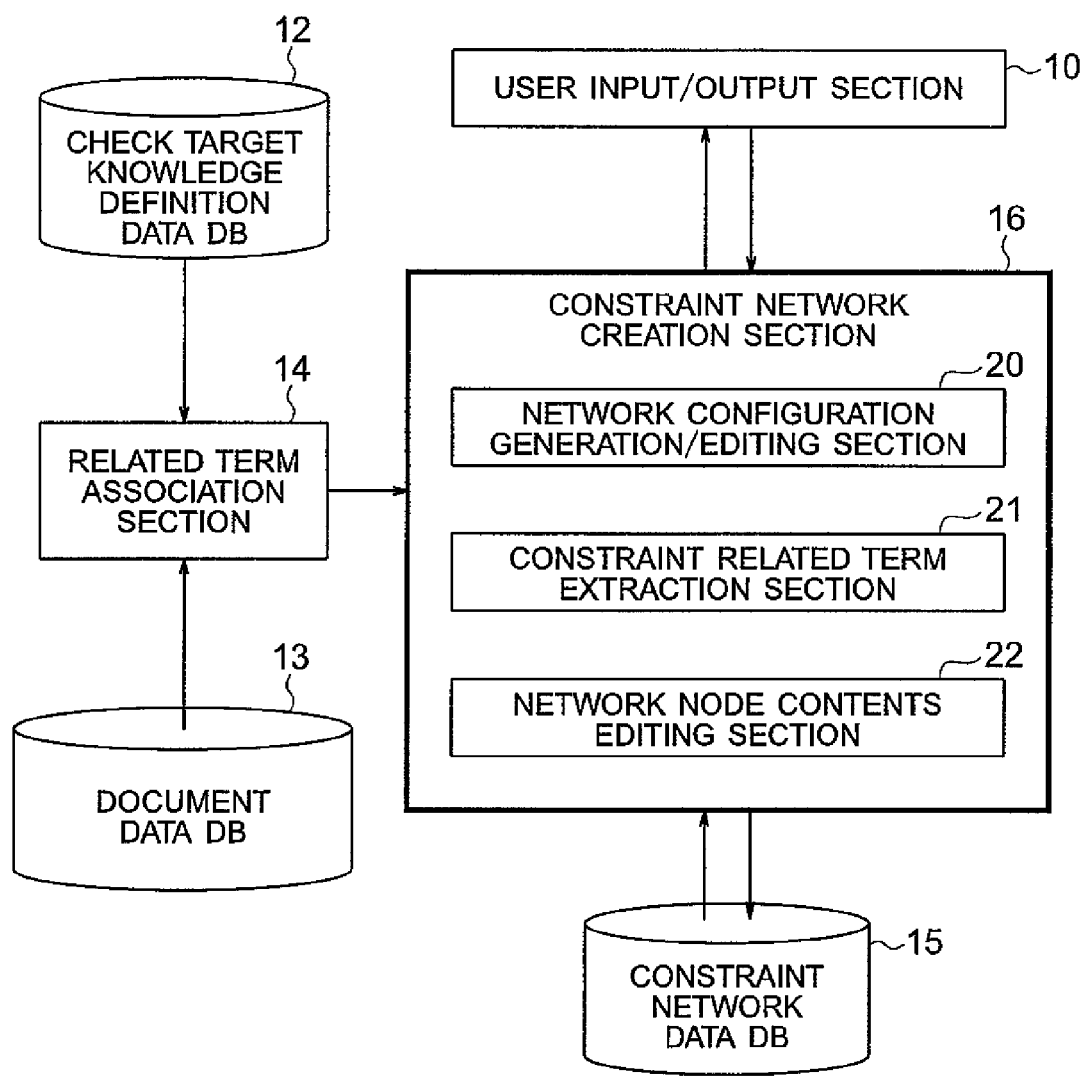
FIG. 3 is a functional block diagram illustrating the basic configuration of the design check knowledge construction system according to a second embodiment of the present invention.

FIG. 3 is a functional block diagram illustrating the basic configuration of the design check knowledge construction system according to a second embodiment of the present invention.

As is the case with the design check knowledge construction system according to the first embodiment, the design check knowledge construction system according to the second embodiment includes the user input/output section 10, the check target knowledge definition data DB 12, the related term association section 14, the document data DB 13, the constraint network creation section 16, and the constraint network data DB 15. However, the constraint network creation section 16 according to the second embodiment includes a network configuration generation/editing section 20, a constraint related term extraction section 21, and a network node contents editing section 22 in order to create constraint network data for a rule check from a group of words simultaneously displayed by the related term association section 14.

The functions of the individual sections of the constraint network creation section 16 will now be described in detail. The network configuration generation/editing section 20 gives an on-screen display of nodes and links to indicate a network representing the relationship among words retained by the check target knowledge definition data DB 12, and displays a group of related words extracted by the related term association section 14 near a node representing the related words of the network. The displayed words may be linked with each other to expressly indicate that they are related to each other. It is preferred that the links used in the above instance be made of a broken line, color-identified, or otherwise differentiated from the existing network links. Further, the user judges whether a link newly generated between words represents actually related words, and then performs a process for finalizing the link. For example, the user may select a link that is indicated by a broken line, and then execute a "SOLIDIFY" command to finalize the link.

When the user selects a node as an editing target from a group of nodes representing a group of words simultaneously displayed on the display screen, the network node contents editing section 22 searches the document data DB 13 by using a word represented by the node as a query, and displays a matching document or text on the display screen. The user then confirms the contents of the selected node and performs an edit while viewing the displayed text. When a check is to be performed through data communication with constraints in a checklist, a CAD system, or the like, the editing method to be used should be suitable for expressing constraint conditions such as an IF statement, THEN statement, and other terms. A node handled as an editing target as described above may be used as a constraint node and displayed in distinction from the other nodes.

The constraint node may be automatically judged instead of allowing the user to formulate a judgment in accordance with a word. More specifically, the constraint related term extraction section 21 prepares a dictionary of terms expressing constraint conditions. When text containing words associated by the related term association section 14 or the text before or after the aforementioned text contains a relevant constraint condition term, a node representing that word may be handled as a constraint node candidate and indicated, for instance, by a broken outline in distinction from the constraint node. When a relevant constraint node candidate is to be finalized, the user performs a finalization process as is the case with the aforementioned link. Incidentally, typical relevant constraint condition terms would be, for instance, "must do" and "must not do."

Figure 4:
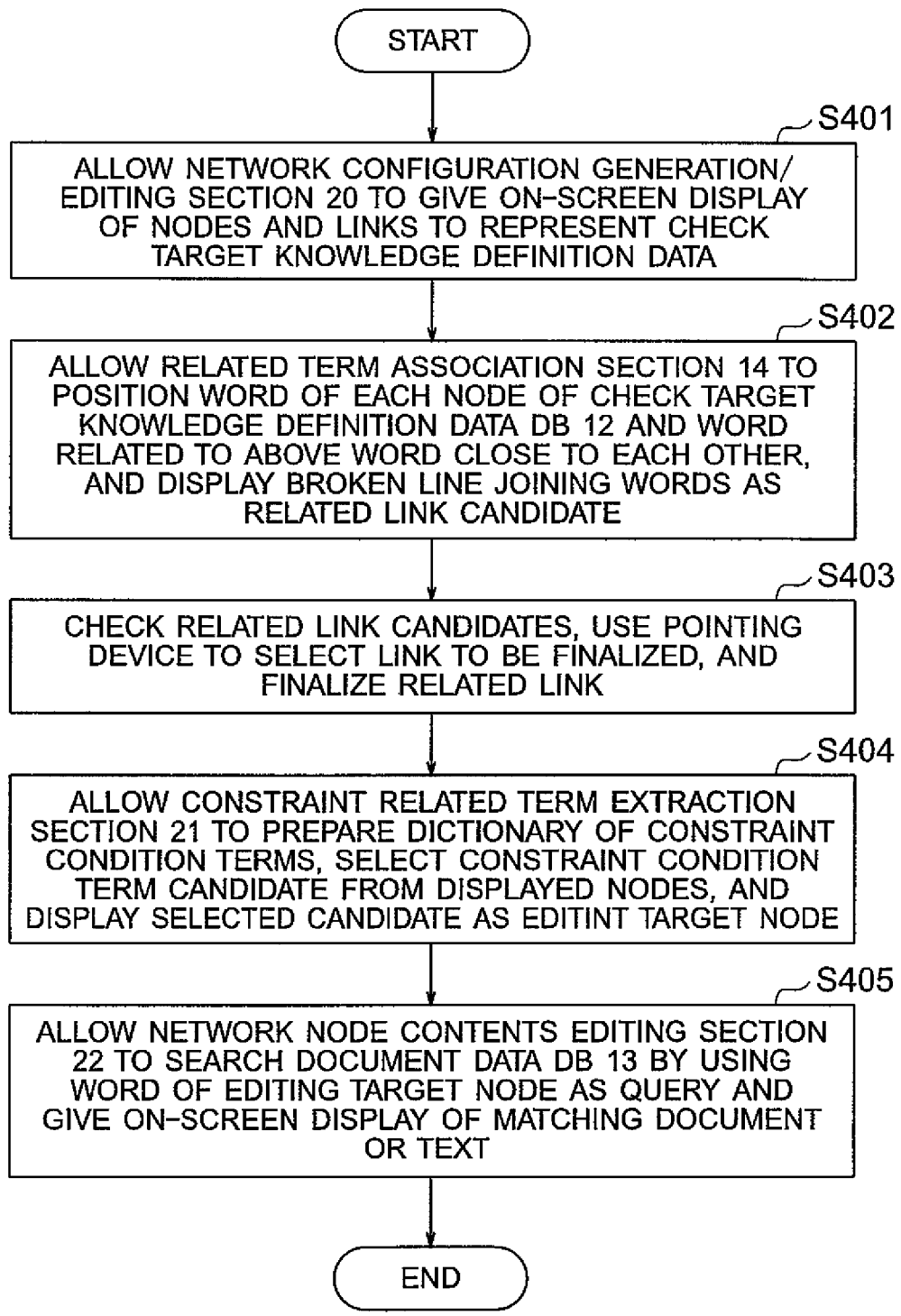
FIG. 4 is a flowchart illustrating simplified operating steps that are performed by a basic function of the design check knowledge construction system shown in FIG. 3.

FIG. 4 is a flowchart illustrating simplified operating steps that are performed by a basic function of the design check knowledge construction system according to the second embodiment.

First of all, the design check knowledge construction system according to the second embodiment performs step S401 in which the network configuration generation/editing section 20 gives an on-screen display of nodes and links to indicate a network representing the relationship among words indicated by the check target knowledge definition data.

Next, step S402 is performed by the related term association section 14 to position a word of each node of the check target knowledge definition data DB 12 and a word related to the above word (a node representing the associated word of a network) close to each other, and displays a broken line joining the words as a related link candidate.

Then, the user performs step S403 to judge whether related link candidates generated in the previous processing step (step S402) are actually related. More specifically, the user checks the related link candidates, uses a pointing device to select the link to be finalized, and finalizes the related link.

Subsequently, the constraint related term extraction section 21 prepares a dictionary of terms expressing constraint conditions. If text containing words associated by the related term association section 14 or the text before or after the aforementioned text contains a relevant constraint condition term, the constraint related term extraction section 21 performs step S404 to check displayed nodes, select a constraint condition term candidate, and display the candidate as an editing target node. In other words, the computer automatically presents an editing target constraint condition node to provide increased editing efficiency.

Further, step S405 is performed. In step S405, the user uses the network node contents editing section 22 to select an editing target node to be edited, search the document data DB 13 by using the associated word as a query, and give an on-screen display of a matching document or text.

The design check knowledge construction system according to the second embodiment also makes it possible to provide construction and maintenance support for check knowledge effective for quality control of the results of product design with high efficiency and with a small number of man-hours.

Figure 5:
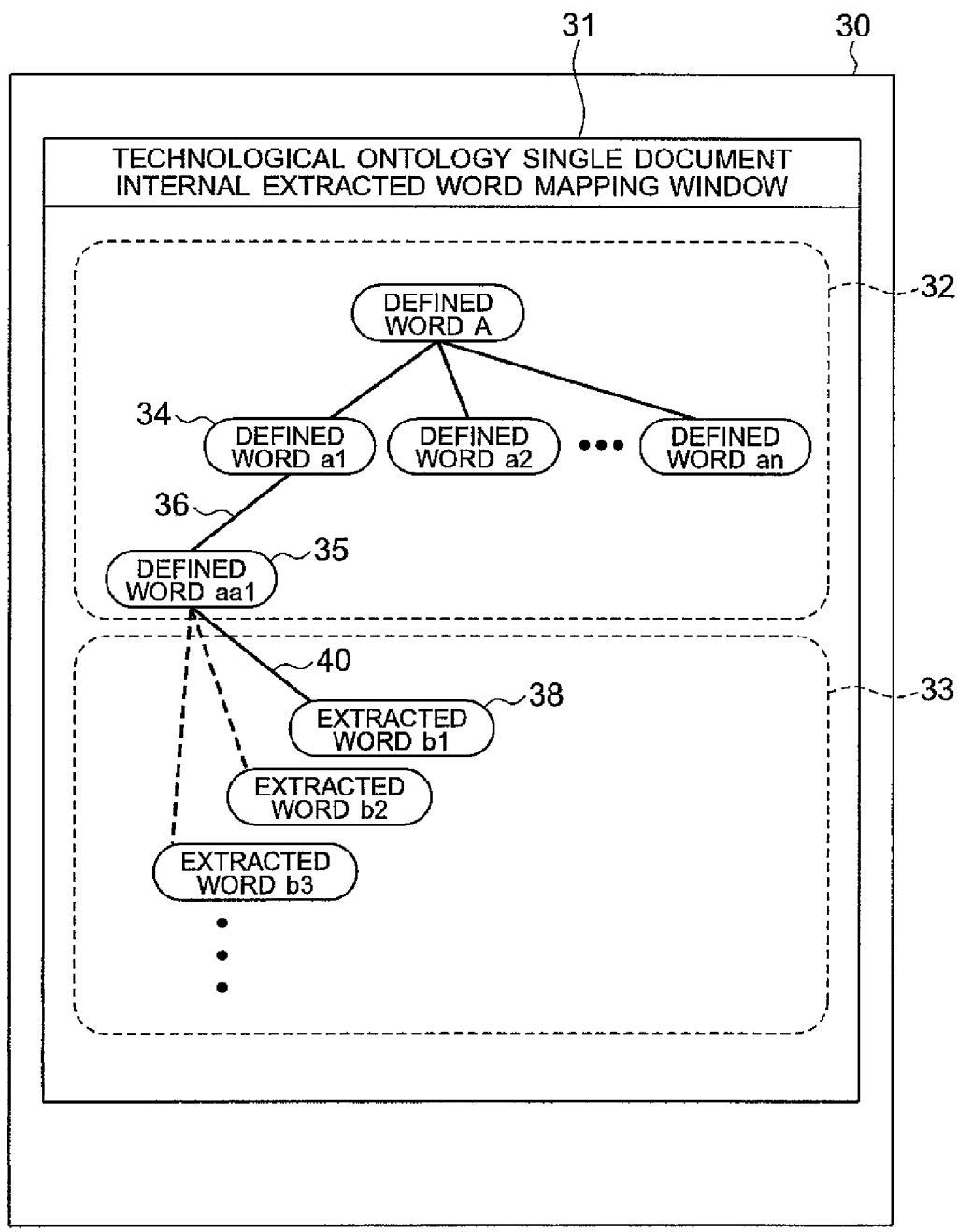
FIG. 5 shows an example of an editing window that appears on the screen of a display of the design check knowledge construction system shown in FIGS. 1 and 3 and is used by a constraint network creation section.

FIG. 5 shows an example of an editing window that appears on the screen 30 of a display of the design check knowledge construction system according to the first and second embodiments and is used by the constraint network creation section 16.

The example editing window on the display screen 30 shown in FIG. 5 is a technological ontology single document internal extracted word mapping window 31. The technological ontology single document internal extracted word mapping window 31 includes a technological ontology display section 32, which shows a knowledge expression tree representing check target knowledge definition data, and a document internal extracted word display section 33, which shows words extracted from the document data DB 13 as related terms. The knowledge expression tree includes nodes 34, 35, which represent defined words, and links 36, which represent the relationship among the defined words.

Meanwhile, the terms (extracted words) related to the defined words are positioned and displayed close to each other. To facilitate user understanding, FIG. 5 shows a broken line indicative of a related link candidate 37 between defined word aa1 (35) and extracted word b1 (38). A perfect matching word, a partial matching word, a synonym, and their collocation words, which are extracted by the related term association section 14, are used as the extracted words.

Figure 6:
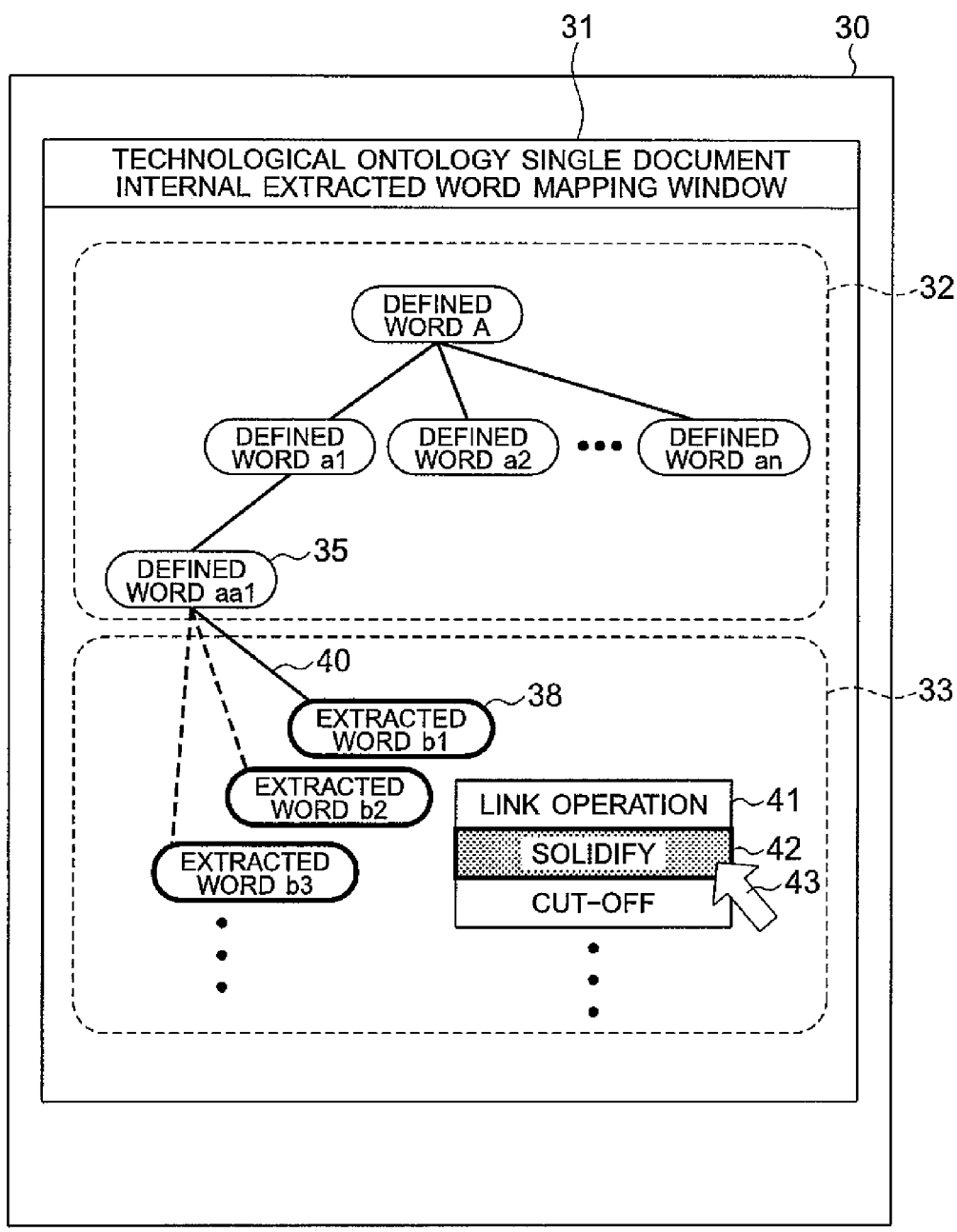
FIG. 6 shows another example of the editing window that appears on the screen of the display of the design check knowledge construction system shown in FIGS. 1 and 3 and is used by the constraint network creation section.

FIG. 6 shows another example of an editing window that appears on the screen 30 of the display of the design check knowledge construction system according to the first and second embodiments and is used by the constraint network creation section 16.

The example editing window shown in FIG. 6 indicates how to finalize a related link in the editing window (technological ontology single document internal extracted word mapping window 31) that is shown in FIG. 5 and used by the constraint network creation section 16.

More specifically, when finalizing the related link candidate 37, which is indicated by a broken line in FIG. 5, the user selects the related link candidate 37 with a mouse or other pointing device. In this instance, the user chooses "LINK OPERATION" from an operation menu 41 as shown in FIG.

6, selects a "SOLIDIFY" command 42 (a "CUT-OFF" command is also available) with a mouse cursor 43, and executes the selected command. Upon command execution, the related link candidate 37, which was indicated by a broken line, is solidified and finalized as a related link 40.

Figure 7:
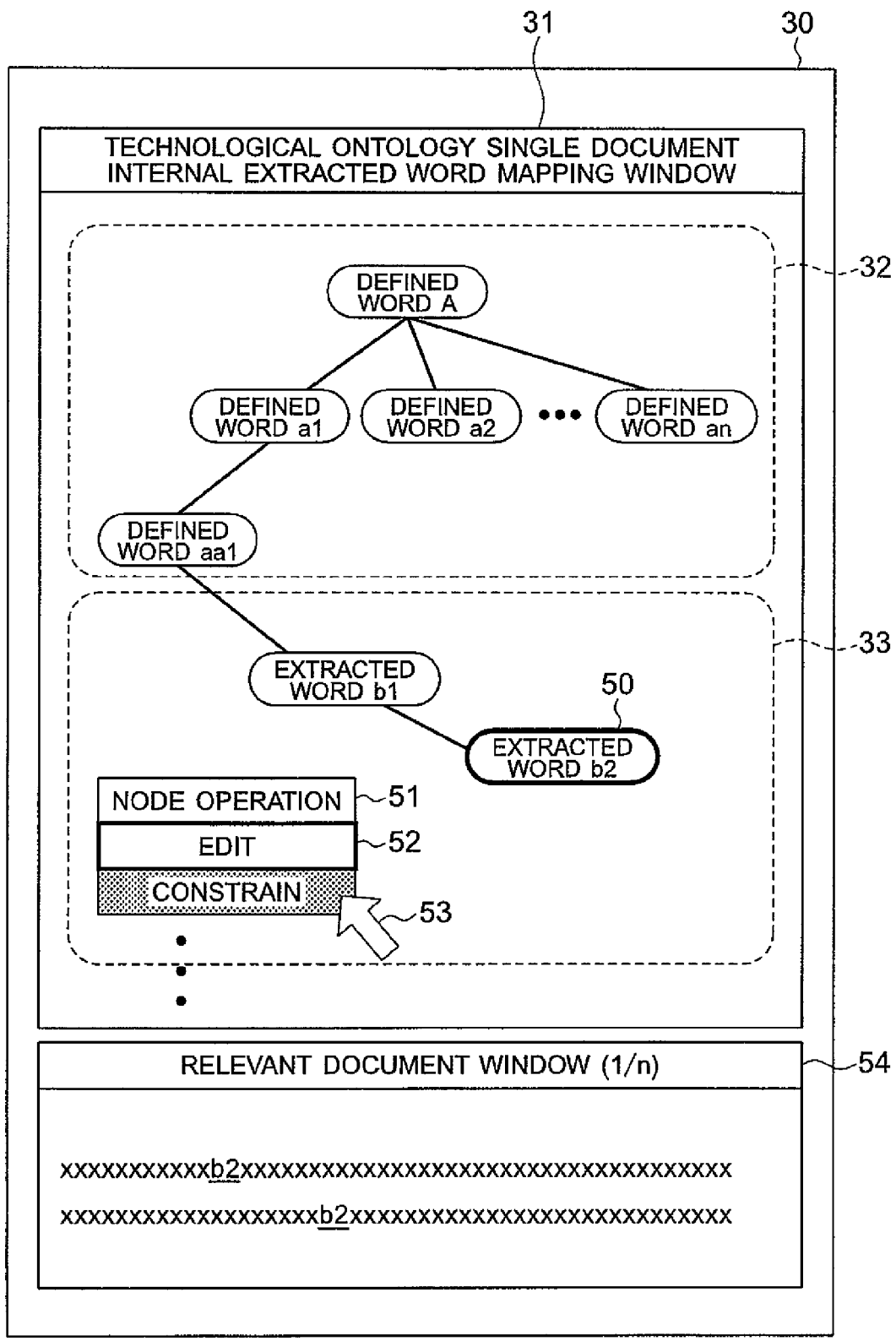
FIG. 7 shows another example of the editing window that appears on the screen of the display of the design check knowledge construction system shown in FIGS. 1 and 3 and is used by the constraint network creation section.

FIG. 7 shows another example of an editing window that appears on the screen 30 of the display of the design check knowledge construction system according to the first and second embodiments and is used by the constraint network creation section 16.

The example editing window shown in FIG. 7 indicates how to edit the contents of a network node in the editing window (technological ontology single document internal extracted word mapping window 31) that is shown in FIG. 5 and used by the constraint network creation section 16.

More specifically, when editing the contents of a network node, the user uses a mouse or other pointing device to select an editing target node 50 for constraint condition definition purposes from a group of nodes representing extracted words, which are extracted from the document data DB 13 as related terms and displayed in the document internal extracted word display section 33. Next, the user chooses "NODE OPERATION" from an operation menu 51, selects an "EDIT" command 52 (a "CONSTRAIN" command is also available) with a mouse cursor 53, and executes the selected command. Upon command execution, the document data DB 13 is searched for text containing extracted word b2 represented by the editing target node 50. The search result then appears on a document display window 54. Further, the location of the relevant extracted word b2 within the text displayed in the document display window 54 becomes highlighted.

[Third Embodiment]

Figure 8:
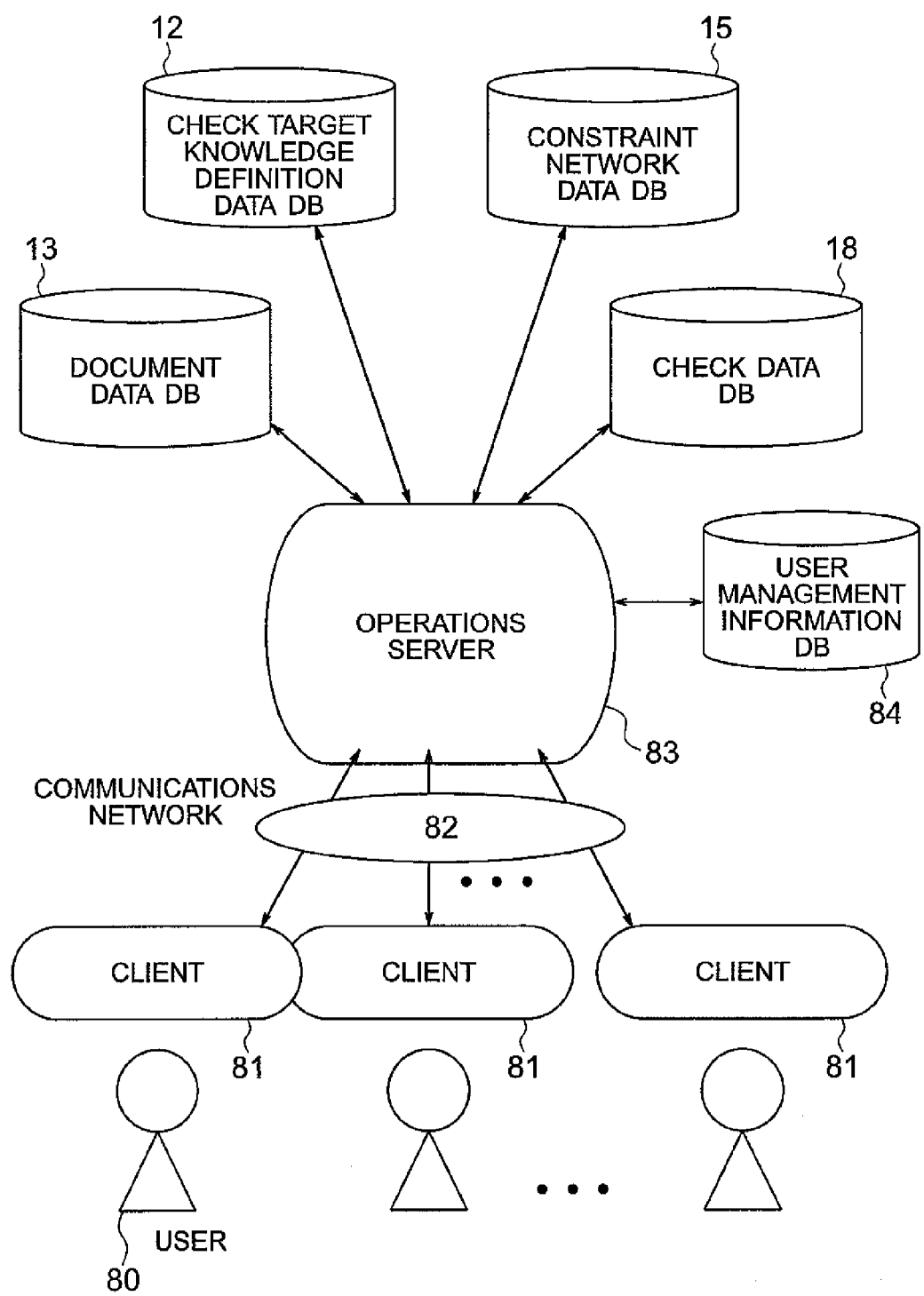
FIG. 8 is a functional block diagram illustrating the basic configuration of the design check knowledge construction system according to a third embodiment of the present invention.

FIG. 8 is a functional block diagram illustrating the basic configuration of the design check knowledge construction system according to a third embodiment of the present invention.

The design check knowledge construction system according to the third embodiment includes an operations server 83 and various databases. The operations server 83 incorporates the functions of the check target knowledge definition section 11, related term association section 14, constraint network creation section 16, and check data generation section 17 of the information processing PC 100 according to the first embodiment. The included databases are the check target knowledge definition data DB 12, the document data DB 13, the constraint network data DB 15, the check data DB 18, and a user management information DB (database) 84, which stores user management information. These databases are connected to the operations server 83. Further, clients 81 used by different users 80 are connected to the operations server 83 through a communications network 82.

In the design check knowledge construction system according to the third embodiment, each user 80 uses a dedicated client 81 to access the operations server 83 through the communications network 82 and shares design information concerning product manufacture. Therefore, the third embodiment makes it possible to provide construction and maintenance support for check knowledge effective for quality control of the results of product design with high efficiency and with a small number of man-hours, as is the case with the first and second embodiments.

More specifically, the design check knowledge construction system according to the third embodiment allows each user 80 to exchange data with the operations server 83 through the communications network 82 by using a client 81 and coordinate data processing operations among various databases (user management information DB 85, check target knowledge definition data DB 12, document data DB 13, constraint network data DB 15, and check data DB 18). As a result, access control is exercised in a manner appropriate for each user 80. Further, various programs are executed, for instance, to edit, register, search, and check various data such as check target knowledge definition data, constraint network data, and check data. The results of various data processing operations are then presented to each user 80. In this instance, exercising exclusive control in accordance with access rights and operations defined in the user management information makes it possible to avoid data inconsistency.

It should be understood by those skilled in the art that various modifications, combinations, sub-combinations, and alterations may occur depending on design requirements and other factors insofar as they are within the scope of the appended claims or the equivalents thereof.

What is claimed is:

1. A design check knowledge construction method that uses a computer to construct check knowledge for evaluating design information about a design target created during design work, the method comprising the steps of:

generating, from input technological basic intelligence, check target knowledge definition data that constructs technological ontology having a tree structure or a network structure and is obtained by defining the check knowledge, which represents a check target field, in accordance with the relationship between a word group and words in the word group; and in accordance with a document data group including a plurality of document data based on knowledge content concerning technological history information, extracting a word group from the document data group associated with the word group in the check target knowledge definition data that constructs the technical ontology and associating words in the word group with each other; and creating a constraint network that is used for a rule check from the word group associated by the step of associating words, wherein the step of creating a constraint network further includes the steps of:

displaying a plurality of related link candidates on a display by use of the technological ontology;

positioning a word of each node and a node representing the associated word of a network close to each other wherein a broken line is displayed joining the words as one of the related link candidates;

selecting the related link candidate from the plurality of related link candidates and finalizing extracted word;

preparing a dictionary of terms expressing constraint conditions wherein if the terms contain one of the positioned words of the nodes or the text before or after the node contains a relevant constraint condition term, then automatically performing the steps of:

checking the displayed link candidates, selecting one of the constraint conditions, and displaying the candidate as an editing target node;

selecting the editing target node from a group of nodes representing an extracted word displayed on the display based on the finalized extracted word; and displaying a text containing the selected editing target node and editing the context.

2. The design check knowledge construction method according to claim 1, wherein the step of associating words includes the step of, when extracting the word group in the document data group related to the word group in the check target knowledge definition data, checking for a match in the word group in the check target knowledge definition data, in a synonym group concerning the word group, and in the word group in the document data group, and outputting a matching word.

3. The design check knowledge construction method according to claim 1, wherein the step of associating words includes the step of, when extracting the word group in the document data group related to the word group in the check target knowledge definition data, checking for a match in the word group in the check target knowledge definition data, in a synonym group concerning the word group, and in the word group in the document data group, making a morphological analysis of text containing a matching word, and outputting a word representing the result of the morphological analysis.

4. The design check knowledge construction method according to claim 1, wherein the step of associating words includes the step of, when displaying the word group in the check target knowledge definition data and the word group in the document data group, positioning the associated words close to each other or interconnecting the associated words with a line segment.

5. The design check knowledge construction method according to claim 1, wherein the step of associating words includes the step of, when extracting the word group in the document data group related to the word group in the check target knowledge definition data, presetting a keyword group for extracting a constraint condition candidate for a check item serving as the check knowledge from the words, searching a relevant document data group containing a keyword in the keyword group, making a morphological analysis of text containing the keyword, and outputting a word representing the result of the morphological analysis.

6. The design check knowledge construction method according to claim 1, wherein the step of associating words includes the step of, when presenting the word group in the check target knowledge definition data and the word group in the document data group, displaying a node representing the word group and a link representing the relationship between the words in the word group, and performing a link selection/status switching process to select a relevant link required for performing a link finalization process, which indicates the association between the words in the word group, and retain and switch the status of the link between finalized and non-finalized.

7. The design check knowledge construction method according to claim 1, further comprising the steps of:
   selecting a word from the associated words as a predefined constraint condition candidate and performing an edit on the selected word to prepare constraint data in the form of text or a mathematical expression; and
   generating check data from the constraint data, the check data being designed for use with an automatic check system coordinated with a predefined list construction function.

8. A design check knowledge construction system that constructs check knowledge for evaluating design information about a design target created during design work, the system comprising:
   a check target knowledge definition section that generates, from input technological basic intelligence, check target knowledge definition data, which constructs technological ontology having a tree structure or a network structure and is obtained by defining the check knowledge that serves as a target field to be checked, in accordance with the relationship between a word group and words in the word group;
   a word association section that, in accordance with a document data group including a plurality of document data based on knowledge content concerning technological history information, extracts a word group from the document data group associated with the word group in the check target knowledge definition data, which constructs the technical ontology, and associates words in the word group with each other; and
   a constraint network creating section that creates a constraint network used for a rule check from the word group associated by the step of associating words, wherein the constraint network creating section further includes:
      a section that displays a plurality of related link candidates on a display by use of the technological ontology;
      a section that positions a word of each node and a node representing the associated word of a network close to each other wherein a broken line is displayed joining the words as one or the related links;
      a section that selects a related link from the plurality of related link candidates and finalizes extracted word;
      a section that prepares a dictionary of terms expressing constraint conditions wherein if the terms contain one of the positioned words of the nodes or the text before or after the node contains a relevant constraint condition term, then automatically performing the steps of:
         checking the displayed link candidates,
         selecting one of the constraint conditions, and
         displaying the candidate as an editing target node;
      a section that selects the editing target node from a group of nodes representing an extracted word displayed on the display based on the finalized extracted word; and
      a section that displays a text constraining the selected editing target node and edits the context;
   wherein at least one of the check target knowledge definition section, the word association section, and a constraint network creating section is effected, at least in part, by a hardware processor.

9. The design check knowledge construction system according to claim 8, wherein, when extracting the word group from the document data group related to the word group in the check target knowledge definition data, the word association section checks for a match in the word group in the check target knowledge definition data, in a synonym group concerning the word group, and in the word group in the document data group, and outputs a matching word.

10. The design check knowledge construction system according to claim 8, wherein, when extracting the word group from the document data group related to the word group in the check target knowledge definition data, the word association section checks for a match in the word group in the check target knowledge definition data, in a synonym group concerning the word group, and in the word group in the document data group, makes a morphological analysis of text containing a matching word, and outputs a word representing the result of the morphological analysis.

11. The design check knowledge construction system according to claim 8, further comprising:
   the display capable of displaying the word group in the check target knowledge definition data and the word group in the document data group;
   wherein, when causing the display to display the word group in the check target knowledge definition data and the word group in the document data group, the word association section causes the display to position the associated words close to each other or interconnect the associated words with a line segment.

12. The design check knowledge construction system according to claim 8, wherein, when extracting the word group from the document data group related to the word group in the check target knowledge definition data, the word association section presets a keyword group for extracting a constraint condition candidate for a check item serving as the check knowledge from the words, searches a relevant document data group containing a keyword in the keyword group, makes a morphological analysis of text containing the keyword, and outputs a word representing the result of the morphological analysis.

13. The design check knowledge construction system according to claim 8, further comprising:
   the display capable of displaying the word group in the check target knowledge definition data and the word group in the document data group;
   wherein, when causing the display to display the word group in the check target knowledge definition data and the word group in the document data group, the word association section causes the display to display a node representing the word group and a link representing the relationship between the words in the word group, and perform a link selection/status switching process to select a relevant link required for performing a link finalization process, which indicates the association between the words in the word group, and retain and switch the status of the link between finalized and non-finalized.

14. The design check knowledge construction system according to claim 8, further comprising:
   a constraint data editing section that selects a word from the words associated by the word association section as a predefined constraint condition candidate and performs an edit on the selected word to prepare constraint data in the form of text or a mathematical expression; and
   a check data generation section that generates check data from the constraint data derived from the constraint data editing section, the check data being designed for use with an automatic check system coordinated with a predefined list construction function.

* * * * *